United States Patent
Funaoka et al.

(10) Patent No.: US 8,075,818 B2
(45) Date of Patent: Dec. 13, 2011

(54) METHOD OF PRODUCING A MICROPOROUS POLYOLEFIN MEMBRANE

(75) Inventors: Hidehiko Funaoka, Yokohama (JP); Kotaro Takita, Yokohama (JP); Norimitsu Kaimai, Yokohama (JP); Shigeaki Kobayashi, Yokohama (JP); Koichi Kono, Asaka (JP)

(73) Assignee: Toray Tonen Specialty Separator Godo Kaisha, Nasushiobara (JP)

( * ) Notice: Subject to any disclaimer, the term of this patent is extended or adjusted under 35 U.S.C. 154(b) by 1549 days.

(21) Appl. No.: 10/973,392

(22) Filed: Oct. 27, 2004

(65) Prior Publication Data

US 2005/0058823 A1    Mar. 17, 2005

Related U.S. Application Data

(62) Division of application No. 09/806,309, filed on Jul. 6, 2001, now Pat. No. 6,824,865.

(30) Foreign Application Priority Data

Oct. 10, 1998   (JP) .................................... 10-294639
Oct. 10, 1998   (JP) .................................... 10-294640

(51) Int. Cl.
    *B29C 47/88*   (2006.01)
(52) U.S. Cl. .... 264/41; 264/45.8; 264/45.9; 264/211.12
(58) Field of Classification Search .................... 264/41, 264/288.8, 344, 510.1, 500.21
    See application file for complete search history.

(56) References Cited

U.S. PATENT DOCUMENTS

| | | | | |
|---|---|---|---|---|
| 3,718,532 A * | 2/1973 | Hayes, Jr. | ................... | 428/310.5 |
| 4,588,633 A | 5/1986 | Kono et al. | ................... | 428/220 |
| 4,734,196 A | 3/1988 | Kono et al. | ............... | 210/500.36 |
| 4,743,375 A * | 5/1988 | Seita et al. | ............... | 210/500.36 |
| 4,873,034 A | 10/1989 | Kono et al. | ..................... | 264/41 |
| 4,927,576 A * | 5/1990 | Seita et al. | ....................... | 264/49 |
| 5,051,183 A | 9/1991 | Takita et al. | ............. | 210/500.36 |
| 5,057,218 A * | 10/1991 | Koshoji et al. | ........... | 210/500.35 |
| 5,677,360 A * | 10/1997 | Yamamori et al. | ............ | 521/134 |
| 5,830,554 A | 11/1998 | Kaimai et al. | | |
| 5,853,633 A * | 12/1998 | Kono et al. | ...................... | 264/54 |
| 5,922,492 A | 7/1999 | Takita et al. | .................. | 429/249 |

FOREIGN PATENT DOCUMENTS

| | | |
|---|---|---|
| EP | 0348887 | 1/1990 |
| EP | 0355214 | 2/1990 |
| EP | 0476198 | 3/1992 |
| JP | 03-034334 A2 | 3/1981 |
| JP | 60-242035 A2 | 12/1985 |
| JP | 61-195132 A2 | 8/1986 |
| JP | 61-195133 A2 | 8/1986 |
| JP | 63-039602 A2 | 2/1988 |
| JP | 63-273651 A2 | 11/1988 |
| JP | 03-105851 A2 | 5/1991 |
| JP | 09-087413 A | 3/1997 |

* cited by examiner

*Primary Examiner* — Monica A Huson
(74) *Attorney, Agent, or Firm* — Westerman, Hattori, Daniels & Adrian, LLP (57) ABSTRACT

A method for producing a microporous polyolefin membrane formed by fine fibrils, the membrane comprising (A) a polyolefin having a weight-average molecular weight of $5 \times 10^5$ or more or (B) a composition containing Component (A), connected to each other, and having micropores of 0.05 to 5 μm in average pore size and crystal lamellas of Component (A) or (B) being in a specific alignment state. The method includes extruding a solution of Component (A) or (B) in a solvent into a gel-like formed article; thermally setting the article, with or without stretching, at least at the crystal dispersion temperature of Component (A) or (B), but at melting point of Component (A) or (B) plus 30° C. or lower; and removing the solvent.

16 Claims, 1 Drawing Sheet

Figure 1

METHOD OF PRODUCING A MICROPOROUS POLYOLEFIN MEMBRANE

CROSS-REFERENCE TO RELATED APPLICATION

This application is a division of U.S. application Ser. No. 09/806,309, filed Jul. 6, 2001, now U.S. Pat. No 6,824,865.

BACKGROUND OF THE INVENTION

1. Field of the Invention

This invention relates to a microporous membrane composed of an ultra-high-molecular-weight polyolefin, more particularly to a microporous polyolefin membrane of high permeability and novel structure, and a method of producing the same.

2. Description of the Prior Art

Microporous membranes are widely used in various applications such as battery separators (in particular, lithium ion type primary and secondary batteries), large-sized battery separators or electrolytic capacitor separators for electric cars or the like, various types of separation membranes (e.g., for water treatment, ultrafiltration, microfiltration and reverse osmosis), various types of filters, moisture-permeable and waterproof clothes and the base materials thereof, etc.

Microporous polyolefin membranes are produced, e.g., by an extraction process comprising the steps of mixing a polyolefin with an organic solvent and inorganic powder such as finely powdered silica, melting and molding the mixture, and extracting the organic solvent and inorganic powder. This method needs a process of extracting the inorganic powder, and permeability of the membrane produced depends largely on particle size of the inorganic powder used and is difficult to control.

Recently, various processes have been proposed to produce high-strength, microporous membranes which contain an ultra-high-molecular-weight polyolefin. For example, Japanese Patent Laid-Open Nos. 60-242035, 61-195132, 61-195133, 63-39602, 63-273651, 3-64334, and 3-105851 disclose processes to produce microporous membranes by forming a gel-like sheet from a heated solution of a polyolefin composition containing an ultra-high-molecular-weight polyolefin dissolved in a solvent, stretching it while heating, and removing the solvent by extraction. These processes give the microporous polyolefin membranes characterized by a narrow pore size distribution and small pore size, which are used for battery separators or the like.

Recently, lithium ion type secondary batteries are required to have a property of high energy density, and microporous membranes of polyolefin having a shut-down function are widely used for the battery separators, to meet the increasing demands for the batteries. However, for the special battery purposes, e.g., those requiring high output at low temperature, a microporous polyolefin membrane of small pore size may cause problems, e.g., increased inner resistance of the battery. Therefore, the microporous polyolefin membranes high in safety and ion permeability are in demand.

SUMMARY OF THE INVENTION

It is an object of the present invention to provide a microporous polyolefin membrane of high permeability and novel structure. It is another object of the present invention to provide a method of producing the same.

The inventors of the present invention have found, after having extensively studied to solve the above problems, that a microporous polyolefin membrane of novel structure, having large pores, high permeability coming from the polyolefin's lamella crystals oriented in the direction perpendicular to the plane parallel to the microporous membrane, and low thermal shrinkage, can be produced by extruding a solution of a specific content of ultra-high-molecular-weight polyolefin or the composition containing an ultra-high-molecular-weight polyolefin dissolved in a solvent, into a gel-like formed article, thermally treating the article under a stress in such a way to prevent shrinkage occurring in a specific temperature range at least in one direction on the membrane, and removing the solvent, to reach the present invention.

The present invention provides a microporous polyolefin membrane with the fine fibrils, composed of (A) a polyolefin having a weight-average molecular weight of $5 \times 10^5$ or more or (B) a composition containing this polyolefin, connected to each other, wherein its average pore size is 0.05 to 5 μm, and the crystal lamellas of the polyolefin inclined at an angle θ of 80 to 100° to the plane constituting the membrane account for at least 40% of the total lamellas both on the section cut in the mechanical direction and on the section cut in the direction perpendicular to the mechanical direction and in the thickness direction. The present invention also provides a method of producing the same microporous polyolefin membrane, comprising the steps of extruding the solution, composed of 10 to 50 weight % of (A) a polyolefin having a weight-average molecular weight of $5 \times 10^5$ or more or (B) a composition containing this polyolefin and 50 to 90 weight % of a solvent, into a gel-like formed article; thermally setting the article, with or without stretching, at least at the crystal dispersion temperature of the (A) polyolefin having a weight-average molecular weight of $5 \times 10^5$ or more or (B) composition containing this polyolefin, but at melting point of the (A) polyolefin having a weight-average molecular weight of $5 \times 10^5$ or more or (B) composition containing this polyolefin plus 30° C. or lower; and removing the solvent.

The crystal dispersion temperature is determined by measuring the temperature characteristics of the dynamic viscoelasticity, in accordance with ASTM D4065, and melting point is the peak temperature observed by a DSC, in accordance with JIS K7211 (the same in the following pages).

DETAILED DESCRIPTION OF THE INVENTION

1. Polyolefin

The polyolefin (A) for the microporous polyolefin membrane of the present invention has a weight-average molecular weight of $5 \times 10^5$ or more, preferably in a range from $1 \times 10^6$ to $15 \times 10^6$. When the weight-average molecular weight is less than $5 \times 10^5$, the membrane tends to suffer deteriorated strength.

The polyolefin composition (B) contains at least 1 weight % of an ultra-high-molecular-weight polyolefin having a weight-average molecular weight of $5 \times 10^5$ or more, preferably $7 \times 10$or more, more preferably in a range from $1 \times 10^6$ to $15 \times 10^6$. When the ultra-high-molecular-weight polyolefin content is less than 1 weight %, the microporous polyolefin membrane of high strength may not be obtained, because of lack of the molecular chains of the ultra-high-molecular-weight polyolefin entwining with each other. Other polyolefins than the ultra-high-molecular-weight polyolefin in the polyolefin composition, i.e., those having a weight-average molecular weight of less than $5 \times 10^5$, preferably have a lower weight-average molecular weight limit of $1 \times 10^4$. When a polyolefin having a weight-average molecular weight of less than $1 \times 10^4$ is used, rupture is likely to take place in the membrane, failing to provide a desired microporous membrane.

When a mixture of (B-1) an ultra-high-molecular-weight polyolefin having a weight-average molecular weight of $5 \times 10^5$ or more and (B-2) a polyolefin having a weight-average molecular weight of less than $5 \times 10^5$ is used, the (B-2)/(B-1) weight ratio of the composition is 0.2 to 20, preferably 0.5 to 10. When the (B-2)/(B-1) weight ratio is below 0.2, the gel-like formed article produced tends to shrink in the thickness direction and decrease in permeability, and viscosity of the solution increases to deteriorate its molding processability. When the (B-2)/(B-1) weight ratio is above 20, on the other hand, concentration of the ultra-high-molecular-weight polyolefin is excessively low, to result in densified gel structure and lowered permeability of the microporous membrane produced.

Examples of the above polyolefins include crystalline homopolymers, two-stage polymers or copolymers of ethylene, propylene, 1-butene, 4-methyl-pentene-1 or 1-hexene, or blends thereof. Preferable among the mare polypropylene, polyethylene and compositions thereof.

The above polyolefin or polyolefin composition has a molecular weight distribution (weight-average molecular weight/number-average molecular weight) of 300 or less, preferably 5 to 50. The molecular weight distribution of above 300 is undesirable, because the membrane comprising such a composition may suffer breakdown by the lower molecular weight components to lose its strength as a whole. When the polyolefin composition is used, it can be obtained by mixing an ultra-high-molecular-weight polyolefin having a weight-average molecular weight of $5 \times 10^5$ or more and a polyolefin having a weight-average molecular weight of less than $5 \times 10^5$ with each other in an adequate ratio to secure the molecular weight distribution to fall in the above range. The polyolefin composition may be the one produced by the multi-stage polymerization or containing two or more types of polyolefins, so long as it has a molecular weight and molecular weight distribution falling in the above ranges.

When the porous polyolefin membrane of the present invention is used for a lithium battery separator or the like, the polyolefin therefor may be incorporated with a polymer capable of giving a shut-down function at low temperature. These polymers include low-density polyethylene, low-molecular-weight polyethylene and linear ethylene-α-olefin copolymer.

The low-density polyethylenes useful for the present invention include branched polyethylene (LDPE) produced by the high pressure process, and linear low-density polyethylene (LLDPE) produced by the low pressure process. The LDPE normally has a density of around 0.91 to 0.93 g/cm$^3$, and melt index (MI at 190° C. and 2.16 kg load) of 0.1 to 20 g/10 minutes, preferably 0.5 to 10 g/10 minutes. The LLDPE normally has a density of around 0.91 to 0.93 g/cm$^3$, and melt index (MI at 190° C. and 2.16 kg load) of 0.1 to 25 g/10 minutes, preferably 0.5 to 10 g/10 minutes. The preferable composition, when the low-density polyethylene is included, is composed of 7 to 69 weight % of an ultra-high-molecular-weight polyethylene having a weight-average molecular weight of $7 \times 10^5$, 98 to 1 weight % of the high-density polyethylene, and 1 to 30 weight % of the low-density polyethylene.

The low-molecular-weight polyethylene useful for the present invention is a polyethylene of low degree of polymerization, having a molecular weight of 1,000 to 4,000 and melting point of 80 to 130° C., and preferably of polyethylene wax having a density of 0.92 to 0.97 g/cm$^3$. The low-molecular-weight polyethylene can be incorporated with (A) a polyolefin or (B) a polyolefin composition at 1 weight % or more, preferably 10 to 70 weight %.

The linear ethylene-α-olefin copolymer useful for the present invention as the one capable of giving a shut-down function at low temperature include a linear ethylene-a-olefin copolymer produced in the presence of a single-site catalyst, e.g., metallocene catalyst, e.g., ethylene-butene-1 copolymer, ethylene-hexene-1 copolymer or ethylene-octene-1 copolymer. The ethylene-α-olefin copolymer has a melting point (DSC peak temperature) of 95 to 125° C., preferably 100 to 120° C. When a copolymer having a melting point of less than 95° C. is used, the battery produced will have characteristics significantly deteriorated at high temperature. Use of a copolymer having a melting point more than 125° C. is also undesirable, because the shut-down function may not be exhibited at an adequate temperature level. The ethylene-α-olefin copolymer has a weight-average molecular weight/number-average molecular weight ratio (Mw/Mn ratio, Q value) of 1.5 to 3.0, preferably 1.5 to 2.5. When incorporated with the ethylene-α-olefin copolymer, the polyethylene or its composition can give the microporous polyethylene membrane for a lithium battery separator or the like, which can be shut down at low temperature when battery inside temperature increases as a result of electrode short circuit. Moreover, it can drastically improve dependence of membrane resistance on temperature when the separator is shut down, and allow the shut-down temperature to be freely controlled. The polyethylene or its composition is incorporated with the ethylene-α-olefin copolymer at 2 to 80 weight %, preferably 5 to 50 weight %. At below 2 weight %, the rapid shut-downeffectmaynot be expected at lowtemperature, and at above 80 weight %, the microporous polyethylene membrane will significantly lose strength.

When a polyethylene is used as the polyolefin for the present invention, it may be incorporated with polypropylene to provide microscopic roughness on the microporous membrane surface, in order to help the membrane hold the electrolytic solution. The polypropylene compounds useful for the present invention include homopolypropylene having a weight-average molecular weight of $1.0 \times 10^4$ or more, preferably in a range from $3.0 \times 10^4$ to $1.0 \times 10^6$, and ethylene/propylene random copolymer and ethylene/propylene block copolymer containing ethylene at 1.0 weight %. When polypropylene having a weight-average molecular weight of less than $1.0 \times 10^4$ is used, the microporous polyolefin membrane produced will be difficult to bore. When the ethylene content exceeds 1.0 weight %, the polyolefin has deteriorated crystallinity, making the microporous polyolefin membrane it gives difficult to bore.

The polypropylene content is 5 to 30 weight %, based on the polyolefin or its composition, preferably 5 to 25 weight %. At below 5 weight %, it cannot form a number of evenly dispersed roughness, making little contribution to the improved electrolyte-holding effect. At above 30 weight %, on the other hand, the microporous polyolefin membrane produced will have significantly deteriorated strength. At a still higher content, it will be difficult to form the sheet, because of the phase separation between the polyethylene and polypropylene taking place during the sheet-forming step.

Incidentally, the polyolefin composition containing the ultra-high-molecular-weight polyolefin component may be incorporated with various additives such as antioxidants, ultraviolet absorbers, antiblocking agents, pigments, dyes, inorganic fillers, etc., if required, within limits not harmful to the object of the present invention.

2. Microporous Polyolefin Membrane

Figure 1:
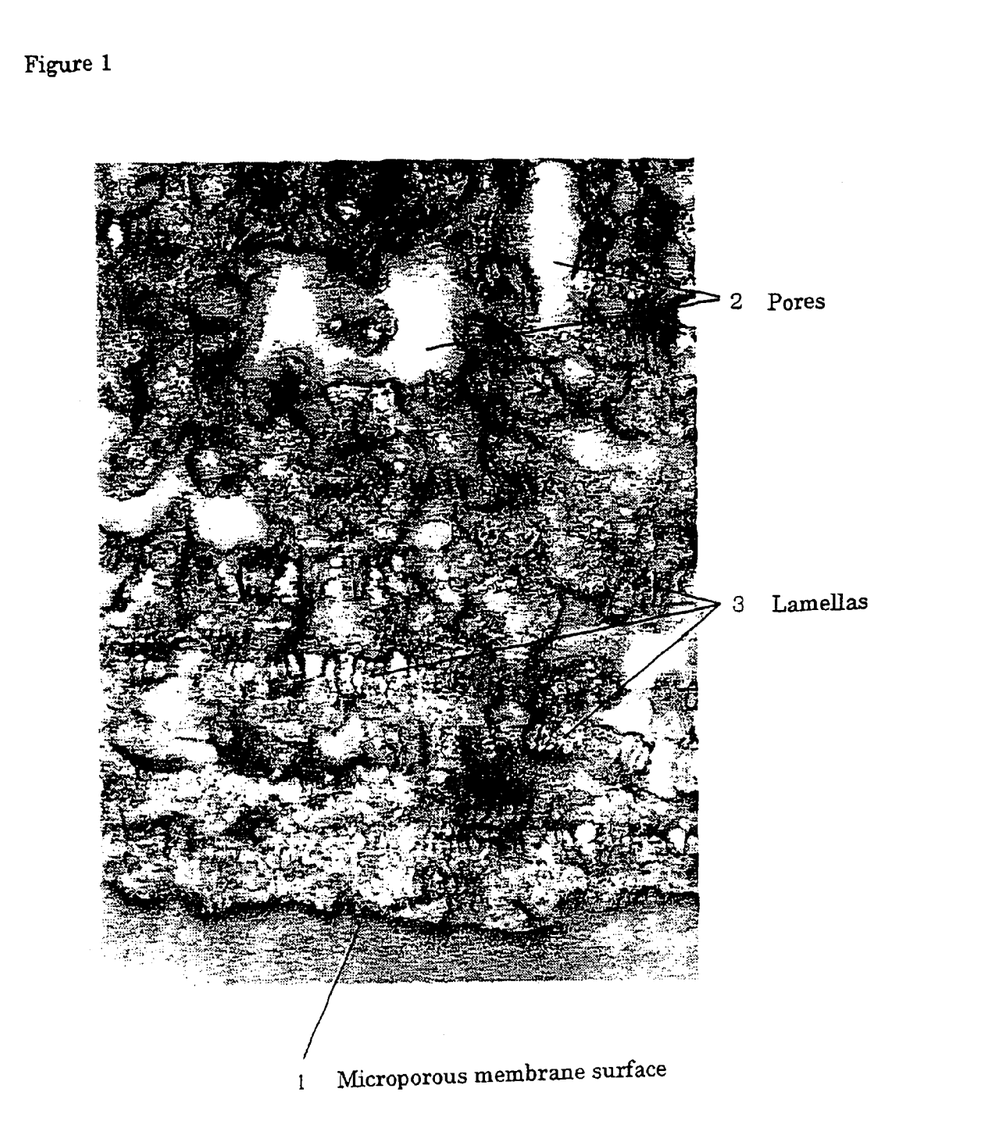
FIG. 1 outlines the structure of the microporous polyolefin membrane of the present invention, observed by transmission electron microscope (magnification: 90,000).

The microporous polyolefin membrane of the present invention has the structure (observed by a transmission electron microscope) composed of the crystal lamellas 3 with the uniformly fibrillated polyolefin which constitute the microporous membrane, as outlined in FIG. 1 presenting the sectional view in the mechanical direction (magnification: 90,000). These crystal lamellas 3 are oriented in the direction almost perpendicular to the membrane surface 1 on the section cut in the mechanical direction.

They are similarly oriented in the direction almost perpendicular to the membrane surface 1 on the section cut in the direction perpendicular to the mechanical direction and in the thickness direction. The crystal lamellas 3 inclined at an angle $\theta$ of 80 to 100° to the membrane surface 1 account for at least 40% of the total lamellas, preferably 70% or more, more preferably 90% or more.

The membrane tends to split in the longitudinal direction by anisotropy, unless the lamellas are oriented in the direction perpendicular to the membrane surface both on the section cut in the mechanical direction and on the section cut in the direction perpendicular to the mechanical direction and in the thickness direction.

When the lamellas inclined at an angle $\theta$ of 80 to 100° to the membrane surface account for less than 40% of the total lamellas, which means that they are not oriented in the direction almost perpendicular to the membrane surface, the membrane will suffer the problems resulting from increased resistance to permeation of the gaseous or liquid medium.

The microporous polyolefin membrane of the present invention having the above structure contains the through-holes 0.05 to 5 μm in average pore size, preferably 0.1 to 2 μm, overall porosity of 40 to 90%, preferably 50 to 80%, and permeability of 10 to 500 sec/100 cc, preferably 50 to 250 sec/100 cc.

The microporous polyolefin membrane of the present invention preferably has the orientation function ratios r (TD) and r (MD) in the crystal b-axis direction, determined by intensity to the rotational axis in the diffraction plane in the wide-angle X-ray diffractometry, and orientation functions in the b-axis direction satisfying the following formulae:

$$100 \geq r(TD) \geq 1.3 \quad (1)$$

$$100 \geq r(MD) \geq 3.5 \quad (2)$$

$$1.0 > \cos^2 ND(b) \geq 0.45 \quad (3)$$

where, $r(TD) = \cos^2 ND(b)/\cos^2 TD(b)$, $r(MD) = \cos^2 ND(b)/\cos^2 MD(b)$, $\cos^2 ND(b)$ is the orientation function of the b-axis of the (020) plane in the thickness direction, which is the result of measurement of the polar sample, $\cos^2 TD(b)$ is the orientation function of the b-axis of the (020) plane in the direction perpendicular to the mechanical direction, which is the result of measurement of the polar sample, $\cos^2 MD(b)$ is the orientation function of the b-axis of the (020) plane in the mechanical direction, which is the result of measurement of the polar sample, $r(MD) = \cos^2 ND(b)/\cos^2 MD(b)$, $\cos^2 ND(b)$ is the orientation function of the b-axis of the (020) plane in the thickness direction, which is the result of measurement of the polar sample, and $\cos^2 MD(b)$ is the orientation function of the b-axis of the (020) plane in the mechanical direction, which is the result of measurement of the polar sample, $r(TD) = \cos^2 ND(b)/\cos^2 TD(b)$, $\cos^2 TD(b)$ is the orientation function of the b-axis of the (020) plane in the direction perpendicular to the mechanical direction.

The membrane tends to easily split when r(TD) or r(MD) exceeds 100, because of excessive directivity. On the other hand, r(TD) of less than 1.3 or r (MD) of less than 3.5 is undesirable, because of insufficient directivity to the membrane surface, and $\cos^2 ND(b)$ of less than 0.45 is also undesirable, because of insufficient orientation.

The microporous polyolefin membrane of the present invention is high in permeability for its properties described above. It can be made into a thin film, making it high in permeability and low in thermal shrinkage, and suitable for battery separators, liquid filters, etc.

3. Method of Producing the Microporous Polyolefin Membrane

In the method of the present invention for producing a microporous membrane, a solution is prepared by dissolving the above polyolefin or its composition in a solvent while heating. Examples of the solvents include aliphatic or cyclic hydrocarbons such as nonane, decane, decalin, p-xylene, undecane, dodecane, paraffin oils, etc., and fractions of mineral oils having boiling points substantially equal to those of the above hydrocarbons. These solvents have a viscosity of 30 to 500 cSt at 25° C., preferably 50 to 200 cSt. Uneven extrusion results when viscosity is below 30 cSt at 25° C., making it difficult to knead the solution, whereas the solvent is difficult to remove in the post treatment when viscosity is above 500 cSt.

Dissolution of the polyolefin or its composition while heating is carried out by stirring its solution at a temperature at which it is completely dissolved in the solvent, or uniformly mixing it and solvent with each other in an extruder. When the polyolefin or its composition is to be dissolved in the solvent with stirring, the dissolving temperature varies depending on the types of polymers and solvents used. It is in the range of 140 to 250° C. in the case of polyethylene composition. It is preferable to effect the dissolution in an extruder, when a high-concentration solution of the polyolefin or its composition is used to produce a microporous membrane.

When the dissolution is to be effected in an extruder, the polyolefin or its composition is first charged in the extruder to be molten, at a temperature preferably 30 to 100° C. above melting point of the polyolefin, although varying depending on type of the polyolefin used. The melting point is described above. For example, it is 160 to 230l ° C., preferably 170 to 200° C., in the case of polyethylene, and 190 to 270° C., preferably 190 to 250° C., in the case of polypropylene. Then, a liquid solvent is added to the polyolefin or its composition in the middle of the extruder.

The concentration of the polyolefin or its composition is 10 to 50 weight % based on the total solution, preferably 10 to 30 weight %, or conversely the concentration of the solvent is 90 to 50 weight %, preferably 90 to 70 weight %. When the polyolefin or its composition concentration is less than 10 weight % (or the solvent concentration is more than 90 weight %), swelling and neck-in are likely to take place at the exit of a die in the process of forming sheets. Accordingly, it is difficult to keep good molding processability and self-supporting characteristics of the sheet produced. On the other hand, when the polyolefin or its composition concentration is more than 50 weight % (or the solvent concentration is less than 50 weight %), the sheet produced will suffer various problems, such as excessive shrinkage in the thickness direction, lowered porosity, and deteriorated molding processability. Accordingly, it is difficult to produce the microporous membrane having large pores. It is possible to control permeability of the membrane by changing the polyolefin or its composition concentration in the above range.

Next, the heated solution of the molten and kneaded polyolefin or its composition is extruded through a die or the like, in such a way to secure the final membrane thickness of 5 to 250 μm, either directly or via another extruder.

Usually used as a die is a sheet die having a rectangular orifice, but a double-pipe hollow die, an inflation die, etc. may be used. When the sheet die is used, a die gap is usually 0.1 to 5 mm, and heated at 140 to 250° C. in the extrusion process. In this case, a casting roll speed is usually 20-30 cm/minute to 15 m/minute.

The solution extruded through the die is formed into a gel-like article by quenching. It is cooled to 90° C. or below, preferably to 80 to 30° C., at a speed of at least 50° C./minute, by cooling the die or the gel-like sheet. As a method of cooling the gel-like sheet, direct contact with cooling air, cooling water or other cooling media, contact with a roll cooled by a coolant, etc. may be employed. Contact with a cooled roll is a preferable method.

The gel-like article produced will have a rough higher-order structure, and the pseudo-cell units that constitute the structure also become rough at an excessively low cooling speed, whereas dense cellar units result at a sufficiently high cooling speed. Decreasing cooling speed to below 50° C./minute makes the gel structure close to that comprising individual bubbles, and increases its crystallization degree, making it difficult to remove the solvent.

The cooling roll is preferably kept at 30° C. to polyolefin crystallization temperature, preferably 40 to 90° C. When cooling roll temperature is excessively high, the gel-like sheet will be cooled slowly to sufficiently increase thickness of the walls defining the lamella structure of the polyolefin, of which the gel structure is composed, tending to make the micropores into the individual bubbles. As a result, the solvent becomes difficult to remove, and membrane permeability decreases. When it is excessively low, on the other hand, the gel-like sheet is quenched excessively rapidly. As a result, the gel structure is excessively densified, decreasing pore size and permeability. The gel-like sheet is withdrawn at 1 to 20 m/minute, preferably 3 to 10 m/minute. Low withdrawal rate is preferable, because neck-in tends to take place on the sheet, making it excessively stretchable.

The gel-like article is then stretched, as required, by an ordinary method, such as a tenter, roll, calender method or a combination thereof at a given stretching ratio. It may be monoaxial or biaxial. In the case of biaxial stretching, the gel-like article may be stretched in the longitudinal and transverse directions simultaneously or sequentially. The simultaneous stretching is more preferable.

The stretching temperature should be in a range from the polyolefin crystal dispersion temperature to 10° C. above the crystal melting point, preferably in a range from the crystal dispersion temperature to the crystal melting point. For a polyethylene composition containing an ultra-high-molecular-weight polyethylene, for example, it is preferably in a range from 90 to 140° C., more preferably from 100 to 130° C. In the case of a polyethylene composition, it is preferably in a range from 90 to 140° C., more preferably from 90 to 125° C. If the stretching temperature is higher than the melting point plus 10° C., the molecular orientation by stretching does not take place because the resin melts. If the stretching temperature is lower than the crystal dispersion temperature, on the other hand, the resin is softened insufficiently, with the result that the membrane tends to break and stretching ratio cannot be well controlled.

The stretching ratio is not limited, but preferably 2 to 400 times as areal stretching ratio, more preferably 15 to 400.

Next, the gel-like article, formed with or without stretching, is thermally set at relatively high temperature under a stress in such a way to prevent shrinkage at least in one direction. The thermal setting at high temperature helps increase pore size and orient the crystal lamellas in the direction perpendicular to the planes running in parallel to the microporous membrane, although the mechanisms involved therein are not fully understood.

The thermal setting is effected at the crystal dispersion temperature of the (A) polyolefin or (B) polyolefin composition or more, but at melting point of the (A) polyolefin or (B) polyolefin composition plus 30° C. or lower. For example, a polyethylene composition containing an ultra-high-molecular-weight polyethylene is thermally set preferably at 100 to 140° C., more preferably 110 to 130° C. At below the crystal dispersion temperature, the crystal lamellas are reoriented insufficiently, bringing about little thermal setting effect. At above the melting point plus 30° C., on the other hand, the microporous membrane may excessively lose strength or be molten, making it difficult to maintain its shape.

Thermal setting temperature is not limited, but preferably 0.1 seconds or more but 100 hours or less. The setting for less than 0.1 seconds can bring little intended effect, essentially incapable of orienting the polyolefin lamellas in the direction perpendicular to the membrane plane and improving permeability much. On the other hand, extending setting time beyond 100 hours is undesirable, because of decreased productivity and accelerated deterioration of the resin.

The thermally set article is then washed with a solvent to remove the residual solvent. Solvents used for this solvent-removing treatment may be volatile ones, including hydrocarbons such as pentane, hexane and heptane; chlorinated hydrocarbons such as methylene chloride and carbon tetrachloride; fluorinated hydrocarbons such as trifluoroethane; and ethers such as diethyl ether and dioxane. These volatile solvents may be used individually or in combination, and their selection depends on the types of the nonvolatile solvents used to dissolve the polyolefin composition. Washing methods with the solvents include an extraction method with solvent, a method of spraying solvent or a combination thereof.

The washing of the thermally set article with a solvent should be performed to such an extent that the content of the residual solvent is less than 1 weight %. The article is finally dried to remove the washing solvent by a heating method, an air-drying method, etc.

The microporous polyolefin membrane produced as mentioned above is a highly permeable one. The resulting microporous polyolefin membrane is, if necessary, subjected to a hydrophilic treatment by plasma irradiation, impregnation with a surface active agent, surface grafting, etc.

EXAMPLES

The present invention is described in more detail by the following preferred embodiments, which by no means limit the present invention. The properties cited in the preferred embodiments were determined by the following test methods:

(1) Weight-average molecular weight and molecular weight distribution: Determined by gel permeation chromatography (GPC), with GPC analyzer (Waters), column (Tosoh's GMH-6) and o-dichlorobenzene as the solvent, operated at 135° C. and flow rate of 1.0 ml/minute.

(2) Membrane thickness: Determined by a tracer type thickness meter (Mitsutoyo LITEMATIC).
(3) Air permeability: Measured according to JIS P8117.
(4) Porosity: Determined by the weight method.
(5) Tensile strength: Breaking strength of the 10 mm wide specimen strip was determined according to ASTM D822.
(6) Average pore size: Measured by Coulter Porometer manufactured by Coulter Co.
(7) Directivity of the lamella to direction perpendicular to the membrane: A total of 100 lamellas were selected from the transmission electron micrographs (TEM, magnification: 90,000) of the section cut in the mechanical direction and of the section cut in the direction perpendicular to the mechanical direction and in the thickness direction, and proportions of those inclined at an angle θ of 80° to 100° to the membrane plane axis were determined.
(8) X-ray analysis: A total of 15 samples, cut to 40 mm in diameter, were placed one on another in such a way to allow identification of the MD and TD directions, and the polar sample was measured by an analyzer (Mac Science, MPF18) operated at an output of 45 KV and 250 mA.
(9) Thermal shrinkage: Determined after exposing the sample to an atmosphere kept at 105° C. for 8 hours.

Example 1

A polyethylene composition (melting point: 135° C., crystal dispersion temperature: 90° C.) having an Mw/Mn ratio of 16.8, composed of 30 weight % of an ultra-high-molecular-weight polyethylene (UHMWPE) having a weight-average molecular weight of $2.5 \times 10^6$ and 70 weight % of a high-density polyethylene (HDPE) having a weight-average molecular weight of $6.8 \times 10^5$ was incorporated with 0.375 weight parts of an antioxidant based on 100 weight parts of the polyethylene composition, to prepare a polyethylene composition. Thirty (30) weight parts of the polyethylene composition was fed to a biaxial extruder (58 mm in diameter, L/D ratio=42, high kneading type), and 70 weight parts of liquid paraffin was also fed to the biaxial extruder from the side feeder, to prepare a polyethylene solution in the extruder by melting the polyethylene composition and kneading it with the liquid paraffin at 200° C. and 200 rpm. The resulting solution was extruded from the T-die attached at the extruder end in such a way to have 25 µm as thickness of the final product, and taken up by a cooling roll, kept at 50° C., to prepare a gel-like sheet. The sheet was then biaxially stretched at 115° C. at an areal stretching ratio of 5 by 5, to prepare the stretched sheet. The sheet was thermally set at 122° C. for 10 seconds, to prepare a polyethylene membrane. The resulting membrane was washed with methylene chloride to remove the residual liquid paraffin by extraction and dried to prepare a 25 µm thick microporous polyethylene membrane. The properties of the membrane are shown in Table 1.

Example 2

A microporous membrane was prepared in the same manner as in EXAMPLE 1 except that it was thermally set at 130° C. for 5 minutes. The properties of the membrane are shown in Table 1.

Comparative Example 1

A microporous membrane was prepared in the same manner as in EXAMPLE 1 except that it was not thermally set. The properties of the membrane are shown in Table 1.

Comparative Example 2

The properties of a commercial microporous membrane, manufactured by Celgard, are shown in Table 1.

TABLE 1

| | Example 1 | Example 2 | Comparative Example 1 | Comparative Example 2 |
|---|---|---|---|---|
| Film forming conditions | | | | |
| Stretching conditions | | | | |
| Stretching ratio | 5 × 5 | 5 × 5 | 5 × 5 | manufactured by Celgard |
| Temperature (° C.) | 115 | 115 | 115 | |
| Thermal setting | | | | |
| Temperature (° C.) | 122 | 130 | — | — |
| Time (seconds) | 10 | 300 | — | — |
| Properties of microporous membranes | | | | |
| Thickness (µm) | 25 | 25 | 25 | 25 |
| Air permeability (sec/100 cc) | 165 | 84 | 550 | 550 |
| Porosity (%) | 50 | 58 | 40 | 40 |
| Tensile strength (kgf/cm$^2$):TD | 800 | 780 | 805 | 460 |
| Average pore size (µm) | 0.38 | 0.60 | 0.03 | 0.08 |
| Directivity of lamellas to the direction perpendicular to the membrane (%) | | | | |
| Section in the MD | 92 | 95 | 38 | 90 |
| Section in the direction perpendicular to the MD and in the thickness direction | 90 | 92 | 32 | 0 |
| X-ray analysis results  a | 0.53 | 0.58 | 0.40 | 0.50 |
| r (TD) | 1.54 | 1.78 | 0.85 | 1.25 |
| r (MD) | 4.2 | 5.1 | 3.0 | 1.25 |
| Thermal shrinkage (%) MD/TD | 6.6/5.0 | 5.0/3.5 | 10.2/7.1 | 9.8/1.0 |

$a = \cos^2 ND(b)$
$r (TD) = \cos^2 ND(b)/\cos^2 TD(b)$
$r (MD) = \cos^2 ND(b)/\cos^2 MD(b)$

Example 3

A polyethylene composition (melting point: 135° C., crystal dispersion temperature: 90° C.), composed of 20 weight % of an ultra-high-molecular-weight polyethylene (UHMWPE) having a weight-average molecular weight of $2.0 \times 10^6$, 66.7 weight % of a high-density polyethylene (HDPE) having a weight-average molecular weight of $3.9 \times 10^5$ and 13.3 weight % of a low-density polyethylene having a melt index of 2.0 (190° C., 2.16 kg) was incorporated with 0.375 weight parts of an antioxidant based on 100 weight parts of the polyethylene composition, to prepare a polyethylene composition. Fifteen (15) weight parts of the polyethylene composition was fed to a biaxial extruder (58 mm in diameter, L/D ratio=42, high kneading type), and 85 weight parts of liquid paraffin was also fed to the biaxial extruder from the side feeder, to prepare a polyethylene solution in the extruder by melting the polyethylene composition and kneading it with the liquid paraffin at 200° C. and 200 rpm. The resulting solution was extruded from the T-die attached at the extruder end in such a way to have 25 µm as thickness of the final product, and taken up by a cooling roll, kept at 50° C., to prepare a gel-like sheet. The sheet was then biaxially stretched at 115° C. at an areal stretching ratio of 5 by 5, to prepare the stretched sheet. The sheet was thermally set at 122° C. for 10 seconds, to prepare a polyethylene membrane. The resulting membrane was washed with methylene chloride to remove the residual liquid paraffin by extraction and dried to prepare a 25 μm thick microporous polyethylene membrane. The properties of the membrane are shown in Table 2.

Example 4

A polyethylene composition, composed of 20 weight % of an ultra-high-molecular-weight polyethylene (UHMWPE) having a weight-average molecular weight of $2.0 \times 10^6$ and 80 weight % of a high-density polyethylene (HDPE) having a weight-average molecular weight of $3.3 \times 10^5$ was incorporated with 0.375 weight parts of an antioxidant based on 100 weight parts of the polyethylene composition, to prepare a polyethylene composition (melting point: 135° C., crystal dispersion temperature: 90° C.) A mixture composed of 30 weight parts of the polyethylene composition and 5 weight parts of polyethylene wax (Mitsui HIGHWAX-100, melting point: 115° C., molecular weight: 1,000, Mitsui Chemicals) was fed to a biaxial extruder (58 mm in diameter, L/D ratio=42, high kneading type), and 70 weight parts of liquid paraffin was also fed to the biaxial extruder from the side feeder, to prepare a polyethylene solution in the extruder by melting the polyethylene composition and kneading it with the liquid paraffin at 190° C. and 200 rpm. The resulting solution was extruded from the T-die attached at the extruder end in such a way to have 25 μm as thickness of the final product, and taken up by a cooling roll, kept at 50° C., to prepare a gel-like sheet. The sheet was then biaxially stretched at 115° C. at an areal stretching ratio of 5 by 5, to prepare the stretched sheet. The sheet was thermally set at 122° C. for 10 seconds, to prepare a polyethylene membrane. The resulting membrane was washed with methylene chloride to remove the residual liquid paraffin by extraction and dried to prepare a 25 μm thick microporous polyethylene membrane. The properties of the membrane are shown in Table 2.

Example 5

A polyethylene composition (melting point: 165° C., crystal dispersion temperature: 90° C.), composed of 20 weight % of an ultra-high-molecular-weight polyethylene (UHMWPE) having a weight-average molecular weight of $2.5 \times 10^6$, 60 weight % of a high-density polyethylene (HDPE) having a weight-average molecular weight of $3.5 \times 10^5$ and 20 weight % of a polyethylene having a weight-average molecular weight of $5.1 \times 10^5$ was incorporated with 0.375 weight parts of an antioxidant based on 100 weight parts of the polyethylene composition, to prepare a polyethylene composition. Thirty (30) weight parts of the polyethylene composition was fed to a biaxial extruder (58 mm in diameter, L/D ratio=42, high kneading type), and 70 weight parts of liquid paraffin was also fed to the biaxial extruder from the side feeder, to prepare a polyethylene solution in the extruder by melting the polyethylene composition and kneading it with the liquid paraffin at 200 rpm.

The resulting solution was extruded at 190° C. from the T-die attached at the extruder end, and taken up by a cooling roll to prepare a gel-like sheet. The sheet was then biaxially stretched at 115° C. at an areal stretching ratio of 5 by 5, to prepare the stretched sheet. The sheet was thermally set at 122° C. for 10 seconds, to prepare a polyethylene membrane. The resulting membrane was washed with methylene chloride to remove the residual liquid paraffin by extraction, dried and heat-treated to prepare a microporous polyethylene membrane. The properties of the membrane are shown in Table 2.

Example 6

A polyethylene composition (melting point: 135° C., crystal dispersion temperature: 90° C.), composed of 17.6 weight % of an ultra-high-molecular-weight polyethylene (UHMWPE) having a weight-average molecular weight of $2.5 \times 10^6$, 70.8 weight % of a high-density polyethylene (HDPE) having a weight-average molecular weight of $3.3 \times 10^5$ and 11.6 weight % of an ethylene-α-olefin copolymer (density: 0.915, melting point: 108° C., ethylene-octene-1 copolymer, AFFINITY FM1570, the Dow Chemical) produced in the presence of a single-site catalyst was incorporated with 0.375 weight parts of an antioxidant based on 100 weight parts of the polyethylene composition, to prepare a polyethylene composition. Thirty (30) weight parts of the polyethylene composition was fed to a biaxial extruder (58 mm in diameter, L/D ratio=42, high kneading type), and 70 weight parts of liquid paraffin was also fed to the biaxial extruder from the side feeder, to prepare a polyethylene solution in the extruder by melting the polyethylene composition and kneading it with the liquid paraffin at 200 rpm.

The resulting solution was extruded at 190° C. from the T-die attached at the extruder end, and taken up by a cooling roll to prepare a gel-like sheet. The sheet was then biaxially stretched at 115° C. at an areal stretching ratio of 5 by 5, to prepare the stretched sheet. The sheet was thermally set at 122° C. for 10 seconds, to prepare a polyethylene membrane. The resulting membrane was washed with methylene chloride to remove the residual liquid paraffin by extraction, dried and heat-treated to prepare a microporous polyethylene membrane. The properties of the membrane are shown in Table 2.

Example 7

A microporous membrane was prepared in the same manner as in EXAMPLE 3 except that it was stretched at 118° C. and thermally set at 130° C. for 30 minutes. The properties of the membrane are shown in Table 2.

Example 8

A microporous membrane was prepared in the same manner as in EXAMPLE 3 except that it was thermally set at 115° C. The properties of the membrane are shown in Table 2.

Comparative Example 3

A microporous membrane was prepared in the same manner as in EXAMPLE 3 except that it was thermally set at 70° C. for 10 seconds. In this case, the membrane was thermally set at a lower temperature than the crystal dispersion temperature (90° C.) of the polyethylene composition containing the ultra-high-molecular-weight polyethylene, and had an insufficient directivity of the lamella to direction perpendicular to the membrane and showed no improvement in permeability.

The properties of the membrane are shown in Table 2.
Table 2

TABLE 2

|  | Example 3 | Example 4 | Example 5 | Example 6 | Example 7 | Example 8 | Comparative Example 3 |
|---|---|---|---|---|---|---|---|
| polyolefin composition | (B) | (C) | (D) | (E) | (A) | (A) | (A) |
| Film forming conditions | | | | | | | |
| Stretching conditions | | | | | | | |
| Stretching ratio | 5 × 5 | 5 × 5 | 5 × 5 | 5 × 5 | 5 × 5 | 5 × 5 | 5 × 5 |
| Temperature (° C.) | 115 | 115 | 115 | 115 | 118 | 115 | 115 |
| Thermal setting | | | | | | | |
| Temperature (° C.) | 122 | 122 | 122 | 122 | 130 | 115 | 70 |
| Time (seconds) | 10 | 10 | 10 | 10 | 1800 | 10 | 10 |
| Properties of microporous membranes | | | | | | | |
| Thickness (μm) | 25 | 25 | 26.9 | 25 | 25 | 25 | 25 |
| Air permeability (sec/100 cc) | 287 | 323 | 188 | 352 | 115 | 330 | 550 |
| Porosity (%) | 53 | 48 | 47 | 42 | 68 | 43 | 40 |
| Tensile strength (kgf/cm$^2$):TD | 810 | 800 | 810 | 830 | 780 | 800 | 805 |
| Average pore size (μm) | 0.31 | 0.18 | 0.30 | 0.12 | 0.40 | 0.06 | 0.03 |
| Directivity of lamellas to the direction perpendicular to the membrane (%) | | | | | | | |
| Section in the MD | 91 | 89 | 92 | 89 | 93 | 61 | 38 |
| Section in the direction perpendicular to the MD and in the thickness direction | 89 | 89 | 95 | 82 | 98 | 57 | 30 |
| X-ray analysis results    a | 0.49 | 0.48 | 0.53 | 0.48 | 0.55 | 0.45 | 0.40 |
| r (MD) | 4.1 | 3.8 | 4.2 | 3.9 | 5.2 | 3.5 | 3.0 |
| r (TD) | 1.54 | 1.48 | 1.58 | 1.50 | 1.78 | 1.43 | 0.85 | polyolefin composition;
(A): 2.5 × 10$^6$ UHMWPE (30 wt %)/6.8 × 10$^5$ HDPE (70 wt %)
(B): 2.5 × 10$^6$ UHMWPE (20 wt %)/3.9 × 10$^5$ HDPE (66.7 wt %)/LDPE (13.3 wt %)
(C): 2.5 × 10$^6$ UHMWPE (19 wt %)/3.3 × 10$^5$ HDPE (76 wt %)/PE Wax (5 wt %)
(D): 2.5 × 10$^6$ UHMWPE (20 wt %)/3.3 × 10$^5$ HDPE (60 wt %)/PP (20 wt %)
(E): 2.5 × 10$^6$ UHMWPE (17.6 wt %)/3.3 × 10$^5$ HDPE (70.8 wt %)/ethylene-octene-1 copolymer (11.6 wt %)
X-ray anarysis;
a = cos$^2$ND(b),
r (MD) = cos$^2$ND(b)/cos$^2$MD(b),
r (TD) = cos$^2$ND(b)/ cos$^2$TD(b)

As described in detail, the microporous polyolefin membrane of the present invention has a structure where the fine fibrils of ultra-high-molecular-weight polyethylene are connected to each other to form the membrane, with micropores in-between, and the crystal lamellas which constitute the fibrils are oriented in the direction perpendicular to the membrane surface. This structure secures large pores, high permeability and low thermal shrinkage, and make the membrane suitable for various devices, e.g., battery separators and liquid filters.

What is claimed is:
1. A method of producing a microporous polyolefin membrane, comprising the steps of
    extruding a solution comprising
        10 to 50 weight % of a polyolefin (A) having a weight-average molecular weight of 5×10$^5$ or more, or a composition (B) containing polyolefin (A) and
        50 to 90 weight % of a solvent
into a gel-like formed article; and then
    thermally setting the article, with or without stretching, at least at the crystal dispersion temperature of said polyolefin (A) or said composition (B), but at the melting point of said polyolefin (A) or said composition (B) plus 30° C. or lower; and subsequently
    removing the solvent.

2. The method of producing a microporous polyolefin membrane according to claim 1, wherein said polyolefin (A) has a weight-average molecular weight of 1×10$^6$ to 15×10$^6$.

3. The method of producing a microporous polyolefin membrane according to claim 1, wherein said polyolefin composition (B) is composed of an ultra-high-molecular-weight polyolefin having a weight-average molecular weight of 1×10$^6$ to 15×10$^6$ and a polyolefin having a weight-average molecular weight of 1×10$^5$ or more but less than 1×10$^6$.

4. The method of producing a microporous polyolefin membrane according to claim 1, wherein said polyolefin composition (B) contains an ultra-high-molecular-weight polyolefin having a weight-average molecular weight of 7×10$^5$ or more at 1 weight % or more.

5. The method of producing a microporous polyolefin membrane according to any one of claims 1 to 3, wherein said polyolefin (A) or polyolefin composition (B) has a weight-average molecular weight/number-average molecular weight ratio (Mw/Mn) of 300 or less.

6. The method of producing a microporous polyolefin membrane according to any one of claims 1 to 3, wherein said polyolefin (A) or polyolefin composition (B) has a weight-average molecular weight/number-average molecular weight ratio (Mw/Mn) of 5 to 50.

7. The method of producing a microporous polyolefin membrane according to any one of claims 1 to 4, wherein said polyolefin (A) or polyolefin for said composition (B) is polypropylene or polyethylene.

8. The method of producing a microporous polyolefin membrane according to any one of claims 1 to 4, wherein the following relationships hold for r(MD)=cos²ND(b)/cos²MD(b) and r(TD)=cos²ND(b)/cos²TD(b), defined by X-ray analysis of the microporous polyolefin membrane:

$$100 \geq r(TD) \geq 1.3$$

$$100 \geq r(MD) \geq 3.5$$

$$1.0 > \cos^2 ND(b) \geq 0.45.$$

9. The method of producing a microporous polyolefin membrane according to any one of claims 1 to 4, wherein said polyolefin composition (B) is composed of a polyolefin having a weight-average molecular weight of $5\times10^5$ or more and polyolefin having a weight-average molecular weight of 1,000 to 4,000 and melting point of 80 to 130° C.

10. The method of producing a microporous polyolefin membrane according to claim 1, 3 or 4, wherein said polyolefin composition (B) is composed of (B-1) an ultra-high-molecular-weight polyolefin having a weight-average molecular weight of $5\times10^5$ or more and (B-2) a polyolefin having a weight-average molecular weight of $5\times10^5$ or less, the (B-2)/(B-1) weight ratio being 0.2 to 20.

11. The method of producing a microporous polyolefin membrane according to claim 1, 3 or 4, wherein said polyolefin composition (B) is composed of a polyolefin having a weight-average molecular weight of $5\times10^5$ or more and polypropylene having a weight-average molecular weight of $3\times10^5$ or more.

12. The method of producing a microporous polyolefin membrane according to claim 1, 3 or 4, wherein said polyolefin composition (B) is composed of a polyolefin having a weight-average molecular weight of $5\times10^5$ or more and ethylene-based copolymer having a melting point of 95 to 125° C. and produced in the presence of a single-site catalyst.

13. The method of producing a microporous polyolefin membrane according to claim 1, 3 or 4, wherein said polyolefin composition (B) is composed of 1 to 69 weight % of an ultra-high-molecular-weight polyolefin having a weight-average molecular weight of $7\times10^5$ or more, 98 to 1 weight % of a high-density polyethylene, and 1 to 30 weight % of a low-density polyethylene.

14. The method of producing a microporous polyolefin membrane according to any one of claims 1 to 4, wherein stretching said gel-like article is an essential step.

15. The method of producing a microporous polyolefin membrane according to claim 14, wherein said gel-like article is stretched, and thermally set at the stretching temperature or higher but at melting point of said polyolefin (A) or polyolefin composition (B) plus 30° C. or lower.

16. The method of producing a microporous polyolefin membrane according to claim 14, wherein said stretching step is effected at an areal ratio of 15 to 400.

* * * * *

UNITED STATES PATENT AND TRADEMARK OFFICE
CERTIFICATE OF CORRECTION

PATENT NO.        : 8,075,818 B2
APPLICATION NO.   : 10/973392
DATED             : December 13, 2011
INVENTOR(S)       : Hidehiko Funaoka et al.

It is certified that error appears in the above-identified patent and that said Letters Patent is hereby corrected as shown below:

Title Page,
Change

"(30)    Foreign Application Priority Data

Oct. 10, 1998 (JP).................................................. 10-294639
Oct. 10, 1998 (JP).................................................. 10-294640"

To be

--(30)    Foreign Application Priority Data

Oct. 1, 1998 (JP).................................................. 10-294639
Oct. 1, 1998 (JP).................................................. 10-294640--

Signed and Sealed this
Sixteenth Day of October, 2012

David J. Kappos
*Director of the United States Patent and Trademark Office*

UNITED STATES PATENT AND TRADEMARK OFFICE
CERTIFICATE OF CORRECTION

PATENT NO. : 8,075,818 B2
APPLICATION NO. : 10/973392
DATED : December 13, 2011
INVENTOR(S) : Hidehiko Funaoka et al.

It is certified that error appears in the above-identified patent and that said Letters Patent is hereby corrected as shown below:

Title Page,
Change

"(30)        Foreign Application Priority Data

Oct. 10, 1998 (JP)................................................ 10-294639
Oct. 10, 1998 (JP)................................................ 10-294640"

To be

--(30)        Foreign Application Priority Data

Oct. 1, 1998 (JP)................................................ 10-294639
Oct. 1, 1998 (JP)................................................ 10-294640--

In Column 2, line 61;
Change

"7 × 10or more"

To be

--7 × $10^5$ or more--

This certificate supersedes the Certificate of Correction issued October 16, 2012.

Signed and Sealed this
Eleventh Day of December, 2012

David J. Kappos
*Director of the United States Patent and Trademark Office*

In Column 6, line 46;
Change

"160 to 2301 °C"

To be

--160 to 230 °C--